United States Patent
Tian

(10) Patent No.: US 9,858,471 B2
(45) Date of Patent: Jan. 2, 2018

(54) IDENTIFICATION APPARATUS AND AUTHENTICATION SYSTEM

(71) Applicant: Kabushiki Kaisha Toshiba, Minato-ku, Tokyo (JP)

(72) Inventor: Guifen Tian, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/067,679

(22) Filed: Mar. 11, 2016

(65) Prior Publication Data
US 2017/0068843 A1    Mar. 9, 2017

(30) Foreign Application Priority Data

Sep. 9, 2015   (JP) .................. 2015-177676

(51) Int. Cl.
G06K 9/00    (2006.01)
G06T 7/60    (2017.01)
G06T 7/00    (2017.01)

(52) U.S. Cl.
CPC ..... *G06K 9/00248* (2013.01); *G06K 9/00281* (2013.01); *G06T 7/0028* (2013.01); *G06T 7/60* (2013.01); *G06T 7/604* (2013.01); *G06T 2207/10012* (2013.01); *G06T 2207/20228* (2013.01); *G06T 2207/30201* (2013.01)

(58) Field of Classification Search
CPC ........... G06K 9/00248; G06K 9/00255; G06K 9/00288; G06T 7/0028; G06T 7/60; G06T 7/604
See application file for complete search history.

(56) References Cited

U.S. PATENT DOCUMENTS

| 7,873,190 B2 | 1/2011 | Yuasa et al. |
| 7,894,636 B2 | 2/2011 | Kozakaya |
| 2007/0098230 A1* | 5/2007 | Norita ............ G06K 9/00214 382/118 |
| 2014/0010444 A1* | 1/2014 | Sasaki ............ G06T 11/60 382/165 |

(Continued)

FOREIGN PATENT DOCUMENTS

| JP | 05-215531 A | 8/1993 |
| JP | 2004-259215 A | 9/2004 |
| JP | 2006-038689 A | 2/2006 |

(Continued)

OTHER PUBLICATIONS

Colombo et al, "3D face detection using curvature analysis", 2006, Pattern Recognition 39 (2006), pp. 444-455.*

*Primary Examiner* — David F Dunphy
(74) *Attorney, Agent, or Firm* — White & Case LLP

(57) ABSTRACT

An identification apparatus has an extraction unit comprising: an extraction unit; an acquisition unit; and an identification unit. The extraction unit extracts, from an object region in an image, a candidate region including candidate points of a predetermined object using parallax information. The acquisition unit acquires a characteristic value based on image information in the candidate region. The identification unit that identifies whether or not the candidate region includes the predetermined object based on similarity between the characteristic value and a reference characteristic value.

16 Claims, 14 Drawing Sheets

(56) References Cited

U.S. PATENT DOCUMENTS

2015/0238087 A1\* 8/2015 Yamashita ........... A61B 5/0077
600/473
2016/0289042 A1\* 10/2016 Fang ......................... G06T 7/10

FOREIGN PATENT DOCUMENTS

| JP | 2007-102601 A | 4/2007 |
| --- | --- | --- |
| JP | 2007-257321 A | 10/2007 |
| JP | 2008-209969 A | 9/2008 |
| JP | 4539519 B2 | 9/2010 |
| JP | 4996943 B2 | 8/2012 |

\* cited by examiner

US 9,858,471 B2

IDENTIFICATION APPARATUS AND AUTHENTICATION SYSTEM

CROSS REFERENCE TO RELATED APPLICATIONS

This application is based upon and claims the benefit of priority from the prior Japanese Patent Application No. 2015-177676, filed on Sep. 9, 2015, the entire contents of which are incorporated herein by reference.

FIELD

Embodiments of the present invention relate to an identification apparatus and an authentication system.

BACKGROUND

Face authentication systems that automatically recognize human faces need to extract a face region. For this purpose, a processing algorithm is conceived which extracts the face region using a positional relationship between the nose tip and nostrils.

In such a processing algorithm, if a distance between a face of an authentication target and a camera is changed or the face is inclined, the accuracy of identification of the nose tip and nostrils may deteriorate, and it is not possible to perform face authentication accurately.

DETAILED DESCRIPTION

Embodiments will now be explained with reference to the accompanying drawings.

There is provided an identification apparatus has an extraction unit comprising: an extraction unit; an acquisition unit; and an identification unit. The extraction unit extracts, from an image data, a candidate region including candidate points of a predetermined object using parallax information. The acquisition unit acquires a characteristic value based on image information in the candidate region. The identification unit that identifies whether or not the candidate region includes the predetermined object based on similarity between the characteristic value and a reference characteristic value.

An identification apparatus according to the present embodiment detects and uses the absolute or physical (herein and after, both absolute and physical size means real size in centimeter of a object) size of a candidate region as well as the physical distance between candidate points in the candidate region in an object, using parallax information corresponding to the object. This suppresses deterioration in identification accuracy of the candidate region due to a variation in a position or posture of the object.

Figure 1:
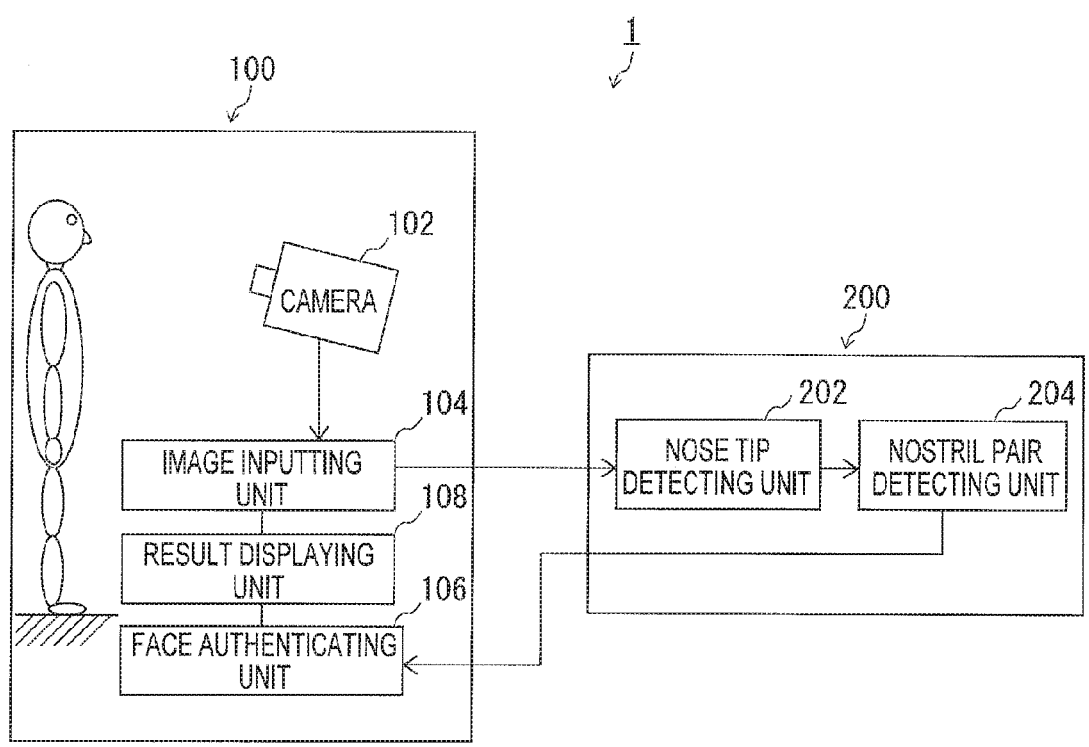
FIG. 1 is a block diagram illustrating a configuration of an authentication system according to an embodiment.

FIG. 1 is a block diagram illustrating a configuration of an authentication system 1. The authentication system 1 receives an image data of the object and authenticates whether or not the object is an object registered beforehand. The authentication system 1 is provided with an authentication apparatus 100 and an identification apparatus 200.

The authentication apparatus 100 is provided with a camera 102, an image inputting unit 104, a face authenticating unit 106 and a result displaying unit 108. The camera 102 is constructed of two cameras and takes an image data of an object to be authenticated, that is, the face of a person whose image data is taken. The distance between lenses of the two cameras is a base length. It is possible to obtain three-dimensional coordinate information of a target object, that is, the face based on a parallax, that is, disparity at coordinates on two brightness (grayscale) image data captured by the cameras. Note that the parallax can be calculated based on the two brightness image data using a general algorithm. That is, the parallax means the value based on the distance between the corresponding pixel in the two brightness image data. Moreover, the camera 102 may be constructed of more than three cameras. Here, the image inputting unit 104 inputs one brightness image data and a parallax image data corresponding to the brightness image data to the identification apparatus 200. The parallax image data is configured by assigning a parallax value per pixel of the brightness image data to pixels of the corresponding parallax image data.

The face authenticating unit 106 authenticates whether or not an object is an object registered beforehand. More specifically, the face authenticating unit 106 authenticates whether or not the face is a face registered beforehand based on position information of the nose tip and the pair of nostrils.

The result displaying unit 108 is constructed of, for example, a monitor and displays authentication results of the face authenticating unit 106.

Figure 2:
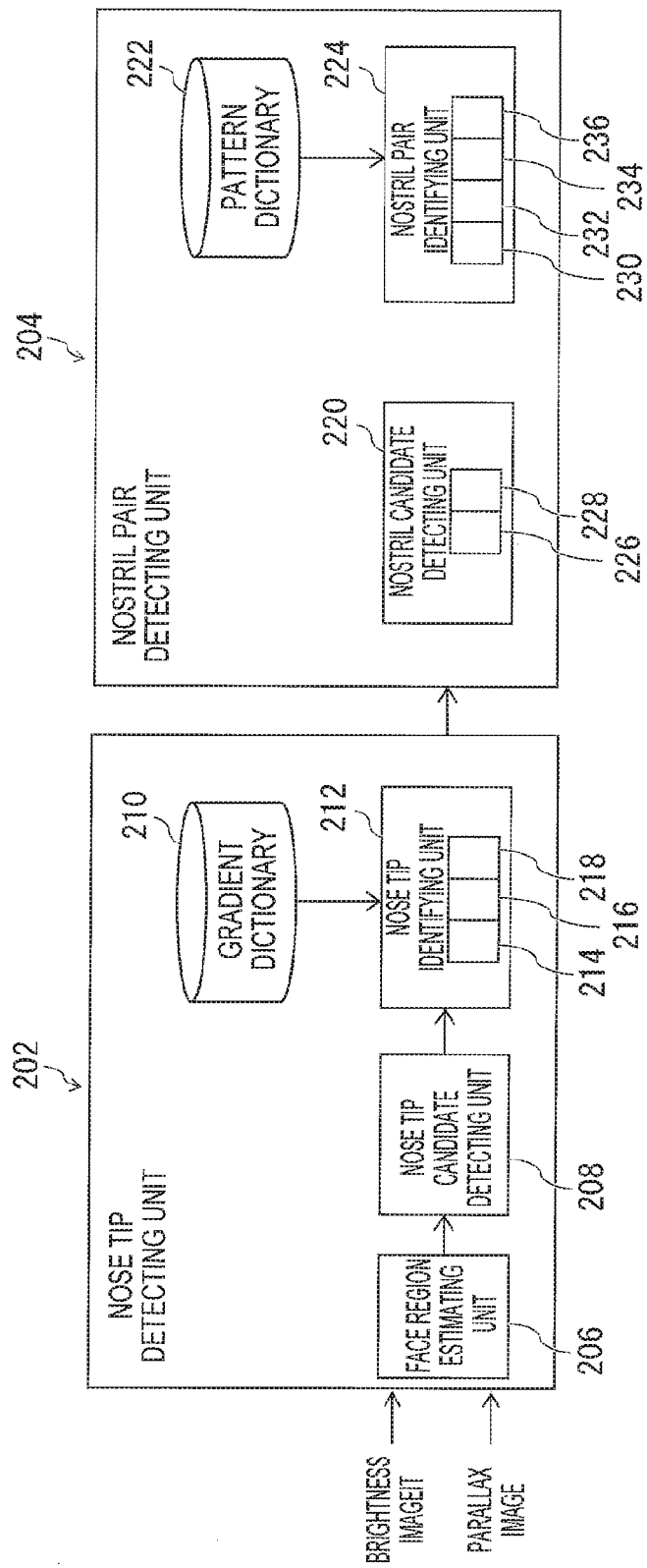
FIG. 2 is a block diagram illustrating a configuration of an identification apparatus according to the embodiment.

The identification apparatus 200 outputs identification results to the face authenticating unit 106. FIG. 2 is a block diagram illustrating a configuration of the identification apparatus 200. The identification apparatus 200 is provided with a nose tip detecting unit 202 and a nostril pair detecting unit 204.

The nose tip detecting unit 202 is provided with a face region estimating unit 206, a nose tip candidate detecting unit 208, a gradient dictionary 210 and a nose tip identifying unit 212. The nose tip detecting unit 202 outputs position information of the nose tip.

The face region estimating unit 206 estimates the face region. More specifically, the face region estimating unit 206 divides the brightness image data or parallax image data into a foreground and a background using parallax information, and estimates a region showing a value greater than a parallax value (threshold) as a face region. Here, pixel values of the parallax image data are used as the parallax information. The face region may be estimated from the parallax image data itself or may be estimated from the brightness image data using the corresponding parallax information.

The nose tip candidate detecting unit 208 transforms two-dimensional coordinates in an object region in the brightness image data into three-dimensional coordinates using the parallax information, and detects candidate points according to the value of a curvature of a three-dimensional curved surface generated based on the three-dimensional coordinates. More specifically, the nose tip candidate detecting unit 208 transforms the two-dimensional coordinates of the brightness image data corresponding to the face region into the three-dimensional coordinates using the parallax information. The nose tip candidate detecting unit 208 then generates a three-dimensional curved surface based on the three-dimensional coordinates, that is, a three-dimensional curved surface corresponding to the face surface. The nose tip candidate detecting unit 208 calculates a curvature of each point on the surface based on the generated three-dimensional coordinates of the curved surface and detects points indicating a curvature value that satisfies a predetermined condition as candidate points of the nose tip.

The gradient dictionary 210 registers reference characteristic values beforehand. The reference characteristic values are feature values calculated based on gradient values in a region including nose tips of a plurality of people, for example. The size of region is predetermined according to the general size of human nose.

The nose tip identifying unit 212 identifies whether or not a region including candidate points (hereinafter referred to as "candidate region") corresponds to a nose tip. The nose tip identifying unit 212 is provided with a first extraction section 214, a first acquisition unit 216, and a first identification unit 218.

The first extraction section 214 extracts a candidate region from the brightness image data based on the position and parallax information of a detected nose tip candidate. That is the first extraction section 214 determines the size of a candidate region in the brightness image data using the parallax information of a nose tip candidate and extracts the candidate region which is centered at the nose tip candidate from the brightness image data. In this case, the size of the candidate region is determined to grow larger as the parallax of the face region increases. That is, as the face approaches the camera 102, the candidate region is determined to become larger. Note that the size of the candidate region is then normalized according to the general size of human nose and the parallax of the face region.

The first acquisition unit 216 obtains feature values using the image information of the candidate region. That is, the first acquisition unit 216 calculates the feature values using the brightness information of the candidate region. As a feature value, for example, a brightness gradient feature (histogram of gradient) is calculated.

The first identification unit 218 identifies whether or not the candidate region corresponds to a predetermined object based on similarity between the feature values and reference characteristic values registered with the gradient dictionary 210. That is, the first identification unit 218 identifies whether or not the candidate region corresponds to a nose tip based on similarity between the feature values calculated in the first acquisition unit 216 and the reference characteristic values.

For example, when there are a plurality of candidate regions, the first identification unit 218 identifies a candidate region showing the highest similarity to the reference characteristic values as the candidate region corresponding to a nose tip. That is, the first identification unit 218 designates the candidate point corresponding to the identified candidate region as the nose tip. The first identification unit 218 then outputs the position information of the nose tip to the face authenticating unit 106.

The nostril pair detecting unit 204 outputs the position information of the nostril pair. The nostril pair detecting unit 204 is provided with a nostril candidate detecting unit 220, a pattern dictionary 222, and a nostril pair identifying unit 224. The nostril candidate detecting unit 220 detects nostril candidates. The nostril candidate detecting unit 220 is provided with a first nostril candidate detecting unit 226 and a second nostril candidate detecting unit 228.

The first nostril candidate detecting unit 226 detects a nostril candidate based on shape information from a region defined based on the position of the nose tip. That is, the first nostril candidate detecting unit 226 detects a region based on a circular shape as a nostril candidate.

The second nostril candidate detecting unit 228 extracts a region, a brightness value of which is equal to or less than a predetermined value and a parallax of which is equal to or less than a predetermined value as a nostril candidate from a region determined based on the position of the nose tip. Moreover, the second nostril candidate detecting unit 228 detects nostril candidates so that the total number of nostril candidates reaches a predetermined number N. That is, the first nostril candidate detecting unit 226 detects nostril candidates first and the second nostril candidate detecting unit 228 detects nostril candidates corresponding to a difference from the predetermined number N.

The pattern dictionary 222 registers reference patterns beforehand. The reference patterns are obtained by averaging image data including nostril pairs of a plurality of people.

The nostril pair identifying unit 224 identifies a pair of nostril from at most N nostril candidates detected by the nostril candidate detecting unit 220. The nostril pair identifying unit 224 is provided with a nostril pair processing unit 230, a second extraction section 232, a second acquisition unit 234 and a second identification unit 236.

The nostril pair processing unit 230 pairs nostril candidates detected by the nostril candidate detecting unit 220. The nostril pair processing unit 230 assumes two nostrils as a nostril pair candidate, if and only if the physical distance between the two nostril candidates and the physical distance from nostril candidates to the nose tip are within a predetermined distance range. Note that physical distance is calculated using the parallax of the three points and distances between them in image data. That is, the distance between the nostril candidates in the image data and the distance between the nose tip and the nostril candidates increase as the corresponding parallax information grows. That is, the distance between nostril candidates and the distance between the nose tip and the nostril candidates in a three-dimensional space are fixed values based on the size of the nose of the person, even when the corresponding parallax information changes during the capturing of image data. The predetermined distance range is defined based on the general physical distances between nostrils and from nostrils to nose tip.

The second extraction section 232 extracts a candidate region based on the nostril pair candidates. Since the distance between the nostril pair candidates in image data is determined by the parallax information, the candidate region increases in size as the face approaches the camera 102. The size of the candidate region is then normalized according to the parallax of the face region.

The second acquisition unit 234 acquires characteristic values based on the image information of the candidate region. That is, the second acquisition unit 234 assumes the brightness information of the candidate region as a template and assumes the pixel values making up the template as characteristic values.

The second identification unit 236 identifies whether or not the candidate region corresponds to a predetermined object based on similarity between this characteristic value and reference characteristic values. That is, the second identification unit 236 identifies whether or not the candidate region corresponds to the nostril pair based on the similarity between the nostril pair candidate image data obtained in the second acquisition unit 234 as the template and a reference pattern. The reference pattern is a reference image data calculated based on the nostril pair image data beforehand and registered with the pattern dictionary 222.

For example, when there are a plurality of candidate regions, the second identification unit 236 identifies a candidate region showing the highest similarity to the reference characteristic values as a candidate region corresponding to the nostril pair. That is, the second identification unit 236 designates the nostril pair candidate corresponding to the identified candidate region as the nostril pair. The second identification unit 236 then outputs the position information corresponding to the nostril pair to the face authenticating unit 106.

Figure 3:
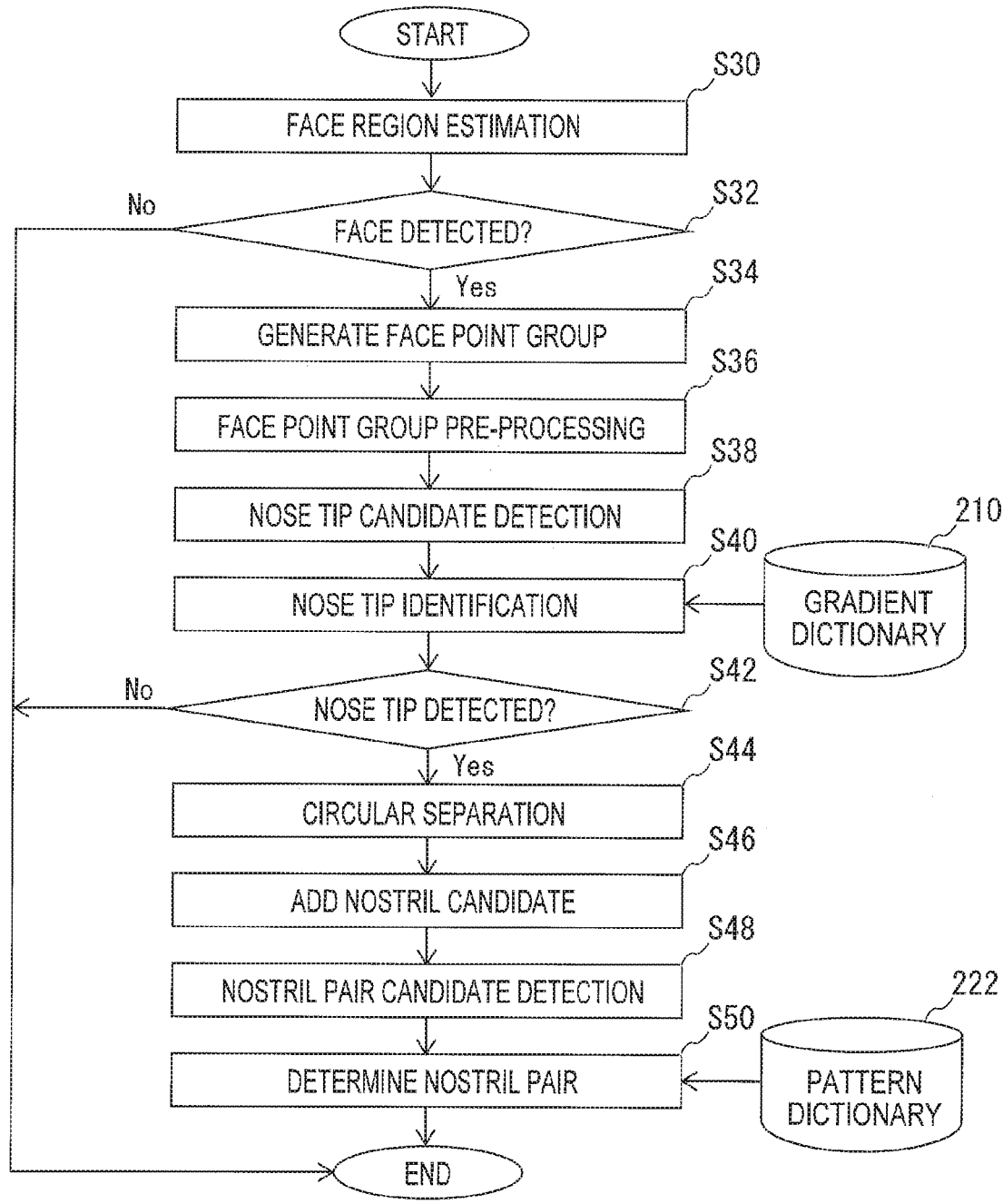
FIG. 3 is a flowchart describing processes by the identification apparatus according to the embodiment.

Next, operation of the identification apparatus 200 will be described. FIG. 3 is a flowchart describing processes by the identification apparatus 200. The face region estimating unit 206 estimates a face region from a brightness image data (S30). That is, the face region estimating unit 206 estimates a foreground region in the brightness image data whose parallax is equal to or greater than a predetermined threshold as the face region using the parallax information. In this case, when the estimated size of the face region and an aspect ratio deviate over a predetermined range, the face region estimating unit 206 determines that the region is not a face region (S32: No), and ends the entire processing. That is, when, of respective foreground regions estimated by gradually changing the threshold, if there is no foreground region where the size and the aspect ratio fall within a predetermined range, the face region estimating unit 206 determines that there is no face region and ends the entire processing.

On the other hand, when the estimated size of the foreground region and the aspect ratio fall within the predetermined range, the face region estimating unit 206 determines that the foreground region is a face region (S32: Yes). The nose tip candidate detecting unit 208 transforms two-dimensional coordinates of image pixels within the object region in the brightness image data, that is, within the face region into three-dimensional coordinates which are a group of face points using the parallax information (S34). Next, the nose tip candidate detecting unit 208 performs processing such as smoothing on the group of face points and removing noise of the group of face points (S36). The nose tip candidate detecting unit 208 calculates a curvature of each three-dimensional point in the group of face points and detects, when curvature values at these three-dimensional points are within a predetermined range, these three-dimensional points as nose tip candidates respectively (S38). Coordinates of the three-dimensional points of each nose tip candidate are inversely transformed into coordinates in a two-dimensional brightness image data using parallax information and designated as candidate points of the nose tip in the brightness image data.

Next, the nose tip detecting unit 202 extracts a candidate region including the candidate points of the nose tip from within the face region and identifies whether or not the candidate region corresponds to the nose tip (S40). In this case, the nose tip detecting unit 202 calculates a feature value using image information within the candidate region and identifies whether or not the candidate region corresponds to the nose tip based on the similarity between this feature value and reference feature values registered with the gradient dictionary 210. That is, when the similarity between the feature value obtained from the candidate region and the reference feature values registered with the gradient dictionary 210, that is, when a comparison score is equal to or greater than a predetermined value, the nose tip detecting unit 202 identifies that the candidate region corresponds to the nose tip. The size of the candidate region is determined based on an average value of the parallax corresponding to, for example, the face region. When the identification result shows that there are a plurality of candidate regions identified as the nose tip, candidate points corresponding to the candidate region having the highest comparison score, that is, the highest similarity is designated as the nose tip.

Next, it is determined whether or not the nose tip exists (S42). When it is determined that the nose tip does not exist (S42: No), that is, when there is no candidate region, the comparison score of which indicates a predetermined value or greater, the entire processing is ended. On the other hand, when it is determined that the nose tip exists (S42: Yes), the nostril candidate detecting unit 220 applies a circular separation filter to the brightness image data and detects nostril candidates (S44).

Furthermore, the nostril candidate detecting unit 220 calculates an absolute physical distance from image pixels in a candidate region to the nose tip using the parallax image data and adds the pixel as a nostril candidate of a given shape if this absolute distance falls within a certain range (S46). That is, the nostril candidate detecting unit 220 extracts image pixels the brightness value of which is equal to or less than a predetermined value and a parallax of which is equal to or greater than a predetermined value from a region determined based on the position of the nose tip as a nostril candidate.

Next, the nostril pair detecting unit 204 pairs any two arbitrary nostril candidates from all nostril candidates as nostril pair candidates (S48). In this case, the nostril pair detecting unit 204 detects nostril pair candidates in which an absolute distance between nostrils of the nostril pair candidates is within a certain range and absolute distances between the nose tip and the respective nostrils are within a certain range. The absolute distance is calculated based on parallax: information corresponding to the face region.

Next, the nostril pair detecting unit 204 identifies whether or not the candidate region corresponds to the nostril pair based on the similarity between characteristic values obtained from the candidate region based on the nostril pair and the reference characteristic values registered with the pattern dictionary 222 (S50). That is, the nostril pair detecting unit 204 compares the image data within the candidate region including the nostril pair candidates as templates with image data of the reference nostril pair registered with the pattern dictionary 222, performs processing of determining the nostril pair candidate within a candidate region having the highest comparison score as a nostril pair and ends the entire processing.

Thus, since a feature value is calculated from the candidate region of the nose tip whose size is determined based on the parallax information corresponding to the face region, even when the distance between the camera 102 and the face varies, it is possible to stably identify the nose tip. A region corresponding to the nostril pair candidates in which an absolute distance between the pair of nostrils falls within a predetermined range is acquired as a template using parallax information corresponding to the face region, and it is thereby possible to stably identify the nostril pair even when the distance between the camera 102 and the face varies. Furthermore, a region in which the brightness value is equal to or less than a predetermined value and the parallax is equal to or greater than a predetermined value is extracted as nostril candidates, and it is thereby possible to extract a nostril candidate even when the orientation of the face is tilted and the shape of the nostril is deviated from the circular shape.

Figure 4:
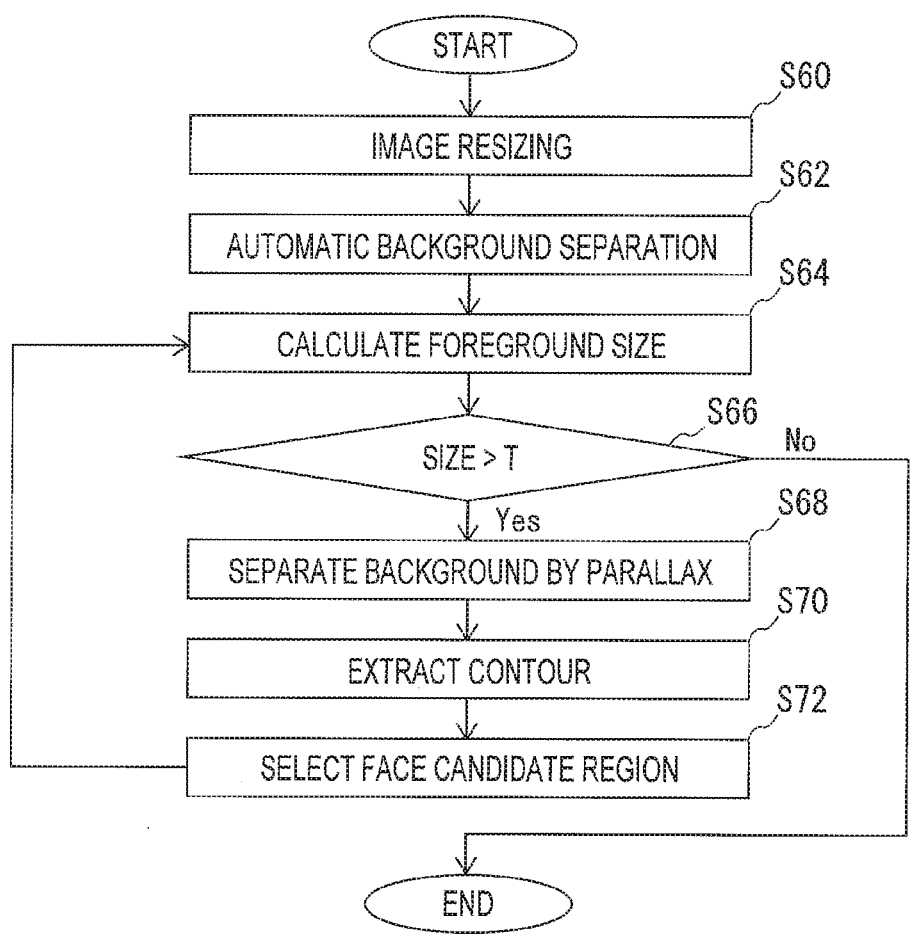
FIG. 4 is a flowchart describing processes by a face region estimating unit according to the embodiment.

Next, operation of the face region estimating unit 206 will be described. FIG. 4 is a flowchart describing processes by the face region estimating unit 206. The face region estimating unit 206 resizes a parallax image data and obtains a reduced parallax image data (S60). As the resizing method, for example, nearest neighbor interpolation, bilinear interpolation or an average value method is used.

Next, the face region estimating unit 206 calculates a separation threshold using a histogram of a reduced parallax image data and removes a background of the reduced parallax image data (S62). That is, for each pixel of the reduced parallax image data, when a pixel value, that is, a parallax value is smaller than a threshold, the face region estimating unit 206 sets a pixel value of the pixel to 0 as the background region. A region where the pixel value is not 0 is a foreground region.

Next, the face region estimating unit 206 calculates the size of the foreground region, that is, "Size" using equation (1) (S64). In equation (1), "B" denotes a distance between lenses of the camera 102, and "Rect_width" and "Rect_height" denote the number of pixels in the horizontal and vertical directions of the minimum rectangle surrounding the foreground, that is, a circumscribing rectangle. Furthermore, "depth_avg" denotes a parallax average value of all pixels in the foreground region.

$$\text{Size} = (B \times (\text{Rect\_width} + \text{Rect\_(height)}))/(2 \times \text{depth\_avg}) \quad (1)$$

$$\text{Size}w = (B \times \text{Rect\_width})/(\text{depth\_avg}) \quad (2)$$

$$\text{Size}h = (B \times \text{Rect\_height})/(\text{depth\_avg}) \quad (3)$$

The "Size" calculated according to equation (1) is compared with the physical size of a known general human faces, that is, threshold T and it is determined whether or not "Size" is greater than threshold T (S66).

When "Size" is greater than threshold T (S66: Yes), it is determined that an object other than the face exists in the foreground region. In this case, the separation threshold is changed and the next background separation is performed (S68). For the changed separation threshold, "depth_avg" can be used. As the execution result in S58, the foreground region before the separation is divided into a plurality of connected regions. Next, the face region estimating unit 206 extracts respective contours of the connected regions (S70). When a plurality of connected regions exist, the respective contours of the connected regions are extracted.

Figure 5:
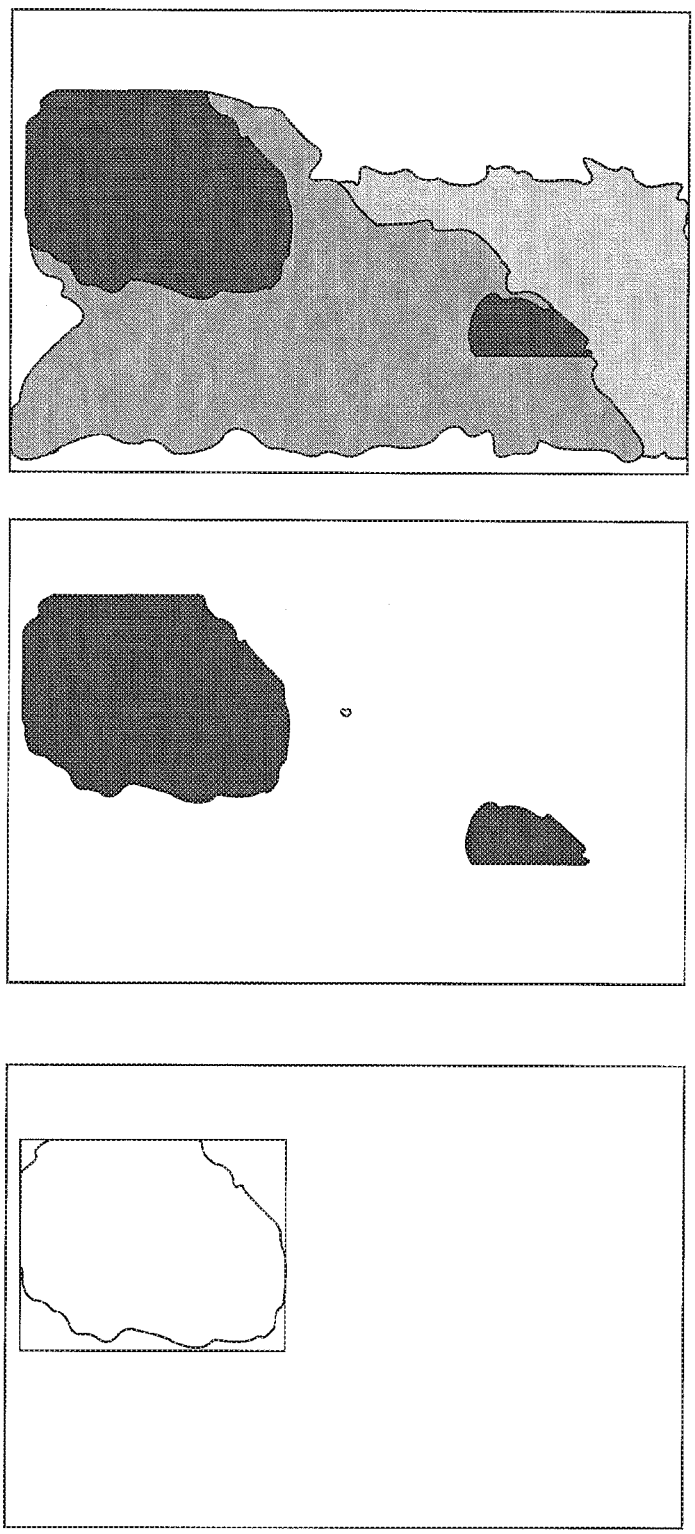
FIG. 5 is a diagram illustrating contours of a foreground region according to the embodiment.

FIG. 5 is a diagram illustrating contours of the foreground region. As shown in FIG. 5(A), a parallax value of a parallax image data is expressed by a pattern of light and dark (the denser the parallax value, the closer to the camera the foreground). In FIG. 5(B), there are a plurality of connected regions and contours exist in the plurality of connected regions.

The face region estimating unit 206 selects a face candidate region as an estimation result from among the contours (S72). In this case, absolute lengths in the horizontal direction "Sizew" and in the vertical direction "Sizeh" in the contour region are calculated using equation (2) and equation (3). A region having a size and an aspect ratio which are most similar to those of a human face is selected as the face candidate region. The rectangle in FIG. 5(C) is an example of the selected face region. After the processing in S72, the flow returns to S64.

When "Size" is smaller than or equal to threshold T (S66: No), the rectangle surrounding the foreground region is estimated as the face region and the processing in the face region estimating unit 206 ends the processing. Thus, the foreground region is separated from the background region using the parallax information and the face region is estimated based on the physical size of the separated foreground region. When there are a plurality of foreground regions, the aspect ratio of the region is also used to estimate the foreground region most likely to be the face as the face region.

Figure 6:
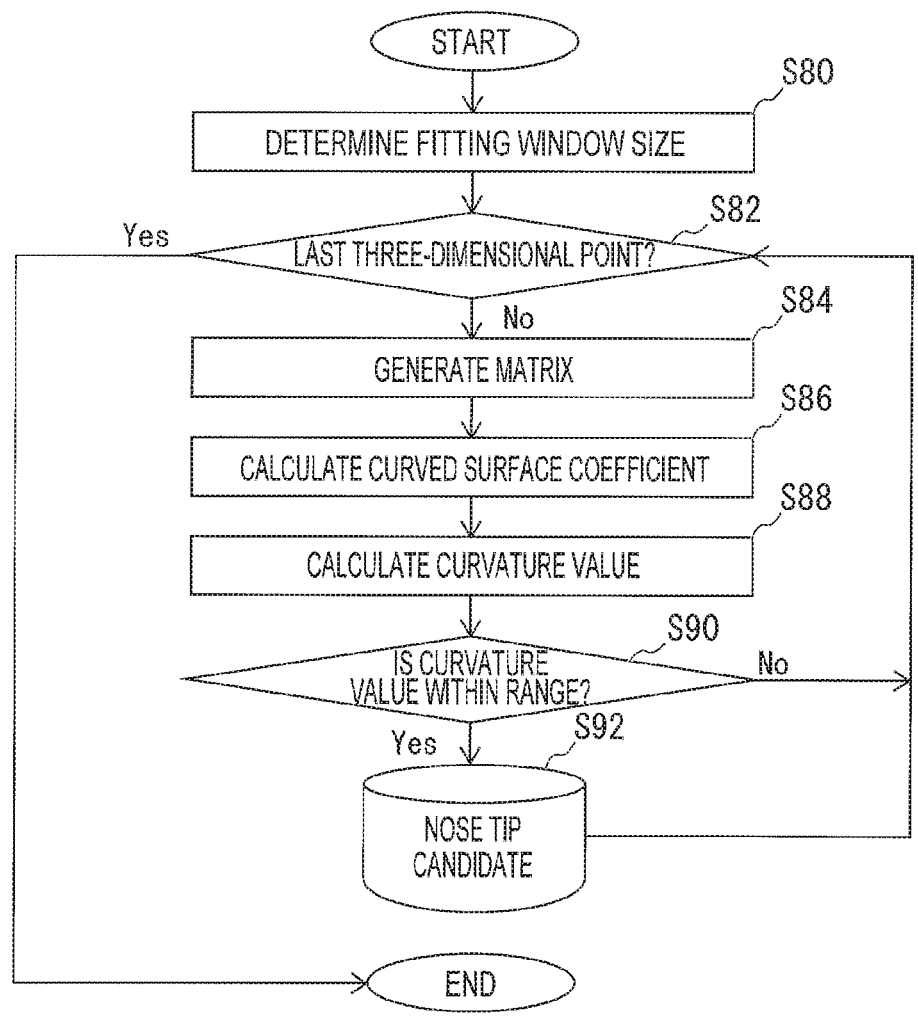
FIG. 6 is a flowchart describing processes by a nose tip candidate detecting unit according to the embodiment.

Next, operation of the nose tip candidate detecting unit 208 will be described. FIG. 6 is a flowchart describing processes by the nose tip candidate detecting unit 208.

Here, a case will be described where a candidate point of the nose tip is detected from within the face region detected by the face region estimating unit 206. Furthermore, a case will also be described where the nose tip candidate detecting unit 208 transforms the face region detected by the face region estimating unit 206 into three-dimension (X, Y, Z). That is, the nose tip candidate detecting unit 208 transforms two-dimensional image pixel (Ix, Iy) (Lx<=Ix<=Rx, Ly<=Ty<=Ry) within the face region (coordinates at left top corner: (Lx, Ly), coordinates at right bottom corner: (Rx, Ry)) into three-dimension (X, Y, Z). The set of three-dimensional points generated by this transformation becomes a three-dimensional point group (point cloud) of the face region. This transformation can be performed using, for example, equation (4).

$$\begin{pmatrix} X \\ Y \\ Z \\ W \end{pmatrix} = Q \times \begin{pmatrix} I_x \\ I_y \\ \text{disparity}(I_x, I_y) \\ 1 \end{pmatrix} \quad (4)$$

In equation (4), "Ix(Iy)" denotes coordinates on the X(Y)-axis of an image pixel in the face region, "disparity (Ix, Iy)" denotes a parallax corresponding to the pixel (Ix, Iy) and "(X, Y, Z)" denotes coordinates of three-dimensional points under a world coordinate system corresponding to (Ix, Iy). "W" is a fixed value and "Q" is a 4×4 perspective transformation matrix determined by a focal length and a distortion coefficient which are inner parameters of the camera 102. When two left and right cameras 102 are used, a rotation matrix and a translation vector between the cameras 102 are also needed to obtain the perspective transformation matrix Q. Generally, the perspective transformation matrix Q can be obtained by executing a camera calibration algorithm which is open to the public.

Here, the point group generated may be used as is. Alternatively, the point group generated may be processed and used. For example, the point group may be subjected to processing of down-sampling and smoothing. When the point group is down-sampled, it is possible to reduce the amount of calculation required to surface-approximate the point group. Note that, surface approximation is performed for one three-dimensional point in the point group, by fitting a number of three-dimensional points within a range surrounding the aforementioned point to a curved surface. On the other hand, when the point group is smoothed, it is possible to further reduce noise and improve the accuracy of surface approximation.

First, the nose tip candidate detecting unit 208 determines the size of a window (width and height are n) for surface approximation, so that each surface approximated from three-dimensional point group corresponds to a partial face region, the size of which is close to human nose. (S80). A curvature corresponding to a three-dimensional point is then calculated using a curved surface within a range defined by the window centered on a three-dimensional point. Here, the curved surface is approximated using p three-dimensional points $(x_i, y_i, z_i)$ $(1 \le i \le p)$ corresponding to p pixels within a rectangular region having a horizontal width of n and a vertical width of n in a two-dimensional image data.

In this case, the width "n" is set according to the actual size of the nose. That is, a number of three-dimensional curved surfaces within the face region corresponding to the actual size of the nose are approximated. The center of a curved surface having a curvature close to human nose curvature is considered as nose tip candidate. The width "n" can be calculated using, for example, equation (5).

$$n = (\text{fit\_size} \times \text{depth\_avg})/B \quad (5)$$

The term "fit_size" is a fixed value and fit_size=36 mm is used here as the size of the human nose. Furthermore, "depth_avg" is an average parallax of the face region estimated by the face region estimating unit 206. Note that when the curved surface is fitted, this may be fitted using three-dimensional points at an interval of "s" $(1 \le s < n/2)$ in the horizontal direction and the vertical direction for speed enhancement. In this case, the number of fitted surfaces is decreased.

Next, it is determined whether or not the processing on all three-dimensional points in the face region has ended (S82). When the processing on all three-dimensional points has not ended (S82: No), a matrix for calculating a curvature from the curved surface corresponding to the next three-dimensional point (CX, CY, CZ) is generated (S84). If the respective coordinates $(x_i, y_i, z_i)$ $(1 \le i \le p)$ of p three-dimensional points surrounding (CX, CY, CZ) within defined window are substituted into equation (6), a matrix necessary to calculate a curved surface coefficient is generated according to equation (7). That is, equation (6) expresses an expression of the curved surface corresponding to the three-dimensional point (CX, CY, CZ).

$$z_i(x_i,y_i) = a + b \times (x_i - CX) + c \times (y_i - CY) + d \times (x_i - CX) \times (y_i - CY) + e \times (x_i - CX)^2 + f \times (y_i - CY)^2 \quad (6)$$

A coefficient "a" is a fixed value and coefficients "b" "c" and "d" are first derivatives of the three-dimensional point (CX, CY, CZ). Moreover, coefficients "e" and "f" are second derivatives of the three-dimensional point (CX, CY, CZ). To obtain the above-described coefficients, equation (6) is transformed into the form of matrix calculation in equation (7). Thus, a curved surface corresponding to the three-dimensional point (CX, CY, CZ) within the face region is generated and a curvature is calculated.

$$A \times X = Z \quad (7)$$

Matrix A is a matrix on the left side of equation (8) and a column vector Z is the right side of equation (8).

$$\begin{pmatrix} 1 & x_1 - CX & y_1 - CX & (x_1 - CX)(y_1 - CY) & (x_1 - CX)^2 & (y_1 - CY)^2 \\ 1 & x_2 - CX & y_2 - CX & (x_2 - CX)(y_2 - CY) & (x_2 - CX)^2 & (y_2 - CY)^2 \\ \vdots & \vdots & \vdots & \vdots & \vdots & \vdots \\ 1 & x_p - CX & y_p - CX & (x_p - CX)(y_p - CY) & (x_p - CX)^2 & (y_p - CY)^2 \end{pmatrix} \times \begin{pmatrix} a \\ b \\ c \\ d \\ e \\ f \end{pmatrix} = \begin{pmatrix} z_1 \\ z_2 \\ \vdots \\ z_p \end{pmatrix} \quad (8)$$

Next, the curved surface coefficients are calculated according to equation (8) (S86). Since coordinates $(x_i, y_i, z_i)$ $(1 \le i \le p)$ of the respective three-dimensional points and coordinates of the three-dimensional point (CX, CY, CZ) which is the center are known, X=vector $(a, b, c, d, e, f)^T$ can be calculated.

Next, a mean curvature H and a Gaussian curvature K of the three-dimensional point (CX, CY, CZ) are calculated using the curved surface coefficients {a, b, c, d, e, f} (S88). The mean curvature and the Gaussian curvature are calculated according to equation (9) and equation (10) respectively.

$$H = [(1+c^2) \times e - b \times c \times d + (1+b^2) \times f]/(1+b^2+c^2)^{1.5} \quad (9)$$

$$K = (4 \times e \times f - d^2)/(1+b^2+c^2)^2 \quad (10)$$

Next, it is determined whether the mean curvature H and Gaussian curvature K are within a range of a predetermined value using equation (11) (S90).

$$H < T_H (T_H \le 0), K \ge T_K (T_K > 0) \quad (11)$$

When both the mean curvature H and the Gaussian curvature K are within a range of a predetermined value (S90: Yes), candidate points are detected by assuming the three-dimensional point (CX, CY, CZ) as a candidate point of the nose tip (S92), and the flow returns to the process in S82. With the nose tip candidate detected according to equation (11), the mean curvature value is smaller than 0 and the Gaussian curvature is greater than 0, and therefore the nose tip is always a convex. On the other hand, when both the mean curvature H and the Gaussian curvature K are not within the range of a predetermined value (S90: No), the flow returns to the process in S82. When processing on all three-dimensional points in the face region ends (S82: Yes), the entire processing is ended.

In this way, the nose tip candidate detecting unit 208 calculates the mean curvature H and the Gaussian curvature K for all three-dimensional points within the face region.

When the mean curvature H and the Gaussian curvature K satisfy predetermined conditions, the three-dimensional points are outputted as candidate points of the nose tip.

Figure 7:
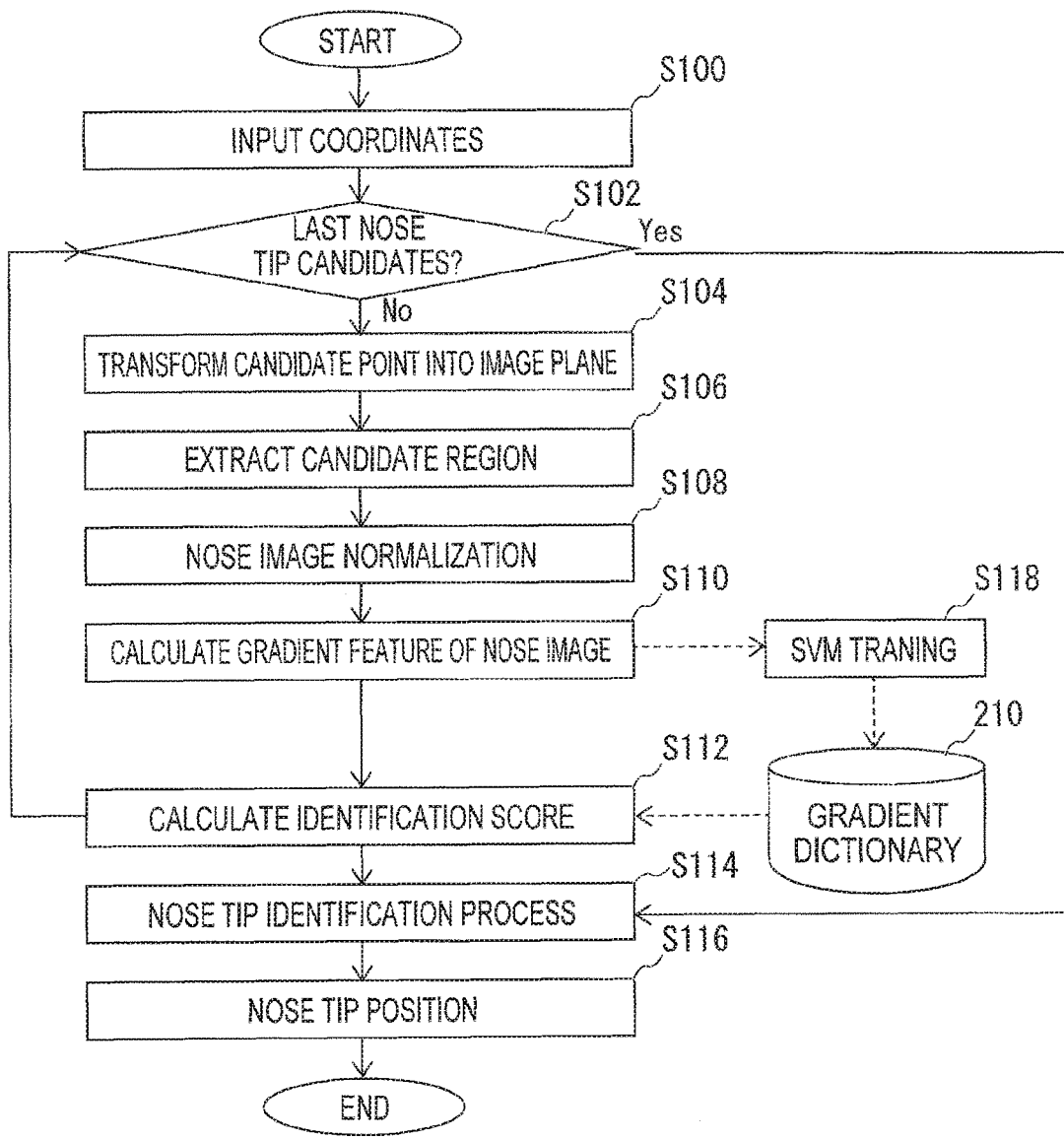
FIG. 7 is a flowchart describing processes by the nose tip detecting unit according to the embodiment.

Next, operation of the nose tip detecting unit 202 will be described. FIG. 7 is a flowchart describing processes by the nose tip detecting unit 202. The nose tip detecting unit 202 first inputs coordinates of candidate points detected by the nose tip candidate detecting unit 208 (S100).

Next, the nose tip detecting unit 202 determines whether or not processing on all the inputted candidate points has ended (S102). When processing on all the inputted candidate points has not ended (S102: No), the first extraction section 214 transforms three-dimensional coordinates of candidate points to be the next processing targets into two-dimensional coordinates in a brightness image data using parallax information (S104). That is, the first extraction section 214 transforms the candidate point (CX, CY, CZ) of the nose tip into coordinates on an image plane. In this case, a candidate point (OX, OY) of the nose tip is calculated as two-dimensional coordinates on a brightness image data at the candidate point (CX, CY, CZ) using the Q matrix in equation (4).

Next, the first extraction section 214 extracts a candidate region within the brightness image data centered on the nose tip candidate point (OX, OY) using equation (5) (S106). That is, the lengths in the horizontal and vertical directions of the candidate region are calculated by substituting parallax values at the (OX, OY) coordinates into "depth_avg" in equation (5).

Next, the first extraction section 214 normalizes the brightness image data within the candidate region into a certain size (S108). Normalization can be processed using, for example, bilinear interpolation. Here, normalization is processed assuming the size of the brightness image data of the nose within the normalized candidate region as 60×60.

Next, the first acquisition unit 216 calculates a brightness gradient HOG (histogram of gradient) feature of the brightness image data within the normalized candidate region (S110). When the HOG feature is calculated, for example, the image data is divided into cells of 6×6 and one cell is divided into blocks of 3×3. Regarding gradient directions, a histogram with gradients in a total of 9 directions in 20-degree increments from 0 to 180 degrees is statistically processed. For this reason, a vector of 3×3×9=81 dimensions is obtained for one block. Thus, a vector of 6561 dimensions is calculated from image data within one candidate region as a feature value.

Next, the first identification unit 218 calculates a score indicating similarity between the calculated feature value and reference feature values registered with the gradient dictionary 210 beforehand (S112). That is, the first identification unit 218 calculates a score of comparison between the calculated feature value and the reference feature values. Then, the flow returns to the process in S102 and when processing on all candidate points is ended (S102: Yes), a candidate point corresponding to a candidate region having the highest comparison score is identified as the nose tip (S114). The coordinates of this nose tip are outputted as the detection result (S116), and the entire processing is ended. Thus, the feature value is calculated based on image information within the candidate region whose size is determined using parallax information and it is identified whether or not the candidate region corresponds to the nose tip based on the similarity with the reference feature values.

For example, a support vector machine (SVM) is used to learn the feature value here and an identifier is configured (S118). That is, the processes in S104 to S110 are performed on a plurality of candidate points whose identification results are known, to calculate a brightness gradient HOG feature accompanied by the identification result as a feature value. Next, the identifier is configured using the support vector machine for these feature values. Thus, it is possible to assign an identification score to a feature value in an unknown category. That is, this identification score shows similarity with a feature value obtained from the candidate region including the nose tip.

For example, this identifier is designed to learn feature values by assigning "1" to a feature value obtained from a candidate region including the nose tip and assigning "−1" to a feature value obtained from a candidate region not including the nose tip. In this case, as a value closer to "1" is assigned to an unknown feature value, the possibility corresponding to the nose tip increases. On the other hand, as a value closer to "−1" is assigned, the possibility corresponding to the nose tip decreases. That is, the higher the similarity between a feature value in an unknown category and a feature value obtained from a candidate region including the nose tip, the closer to "1" is the value assigned to the unknown feature value.

Figure 8:
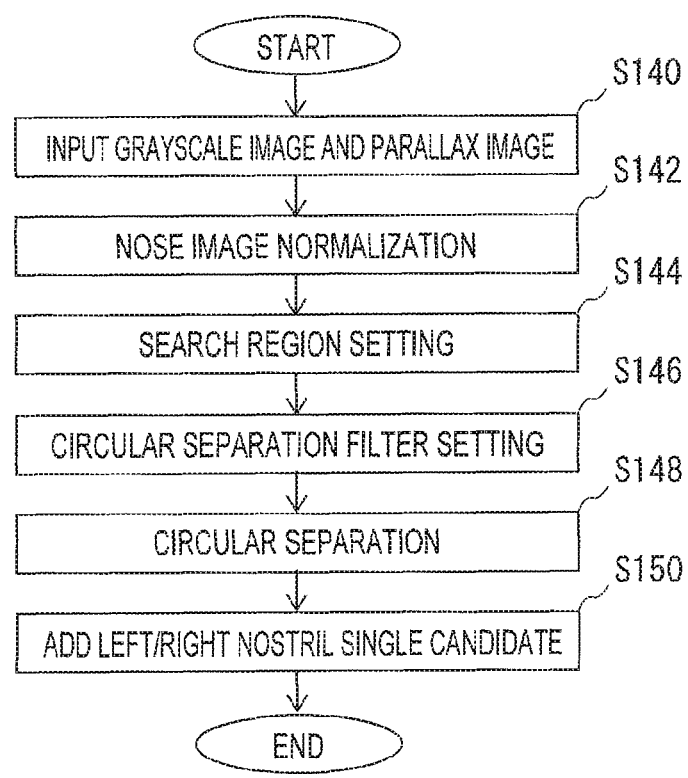
FIG. 8 is a flowchart describing processes by a first nostril candidate detecting unit according to the embodiment.

Next, operation of the first nostril candidate detecting unit 226 will be described. FIG. 8 is a flowchart describing processes by the first nostril candidate detecting unit 226. A parallax image data together with brightness image data is inputted to the first nostril candidate detecting unit 226 (S140).

Next, the first nostril candidate detecting unit 226 extracts a candidate region from within the brightness image data centered on the nose tip (OX, OY) using equation (5) and normalizes the candidate region into a certain size (S142). Normalization can be processed using, for example, bilinear interpolation. Here, such processing is performed assuming the size of the normalized candidate region is 60×60. That is, the lengths in the horizontal and vertical directions of the candidate region are calculated by substituting parallax values at the (OX, OY) coordinates into "depth_avg" in equation (5). Since normalization is performed using parallax information at the nose tip position, the parallax image data can be obtained in a fixed size.

Figure 9:
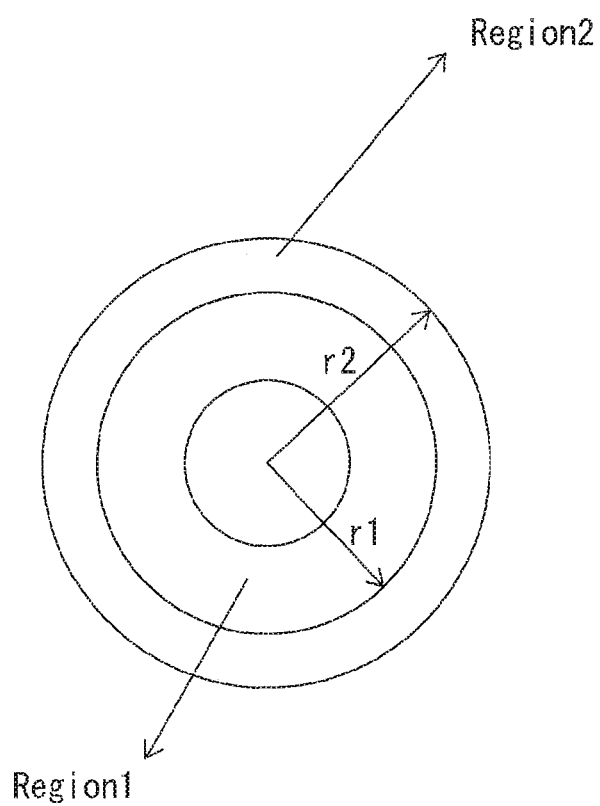
FIG. 9 is a diagram illustrating an example of a circular separability filter according to the embodiment.

Here, a circular separability filter will be described. FIG. 9 is a diagram illustrating an example of the circular separability filter. The circular separation filter is a filter that defines two circular regions. That is, the circular separability filter is constructed of concentric circles "Region1" and "Region2" having different radiuses r1 and r2 respectively. The degree of separation of brightness values between "Region1" and "Region2" is calculated. When a certain region is divided into two regions, the degree of separation is a proportion of a brightness variation between the regions in a brightness variation of a universal region. The degree of separation takes a maximum value of 1.0 when the two regions are completely separated and approaches a minimum value of 0 when the two regions are not separated. The circular separability filter exhibits a high value in the vicinity of the circular nostrils and has a characteristic of being not susceptible to illumination variations or noise.

The first nostril candidate detecting unit 226 sets a search region to which the circular separability filter is applied (S144). The nostrils may be located at various positions with respect to the nose tip. For this reason, all brightness image data centered on the nose tip may be searched. Alternatively, when great importance is placed on the processing amount, the search range may be determined depending on the distance from the nose tip. That is, based on the physical distance from the nose tip, regions where the nostrils are less likely to exist may be removed from the search region.

Next, the first nostril candidate detecting unit 226 sets a radius of the circular separation filter (S146). Outer/inner radiuses of the filter can be set according to the size of a normalized nose image data respectively.

Next, the first nostril candidate detecting unit 226 applies circular separability filter to the normalized nose image data (S148). Through this processing, values as a result of conducting circular separability filter are obtained in correspondence with each pixel of the normalized nose image data. Here, an image data obtained by assigning the values of the circular separability filter to the respective pixels of the normalized nose image data is assumed to be a result image data.

Next, the first nostril candidate detecting unit 226 designates pixels in the result image data that exceed a predetermined value as nostril candidates (S150). In this case, regions exceeding a predetermined value may be subjected to labeling processing or the like and typical points in each region to which a label is assigned may be assumed to be nostril candidates.

Figure 10:
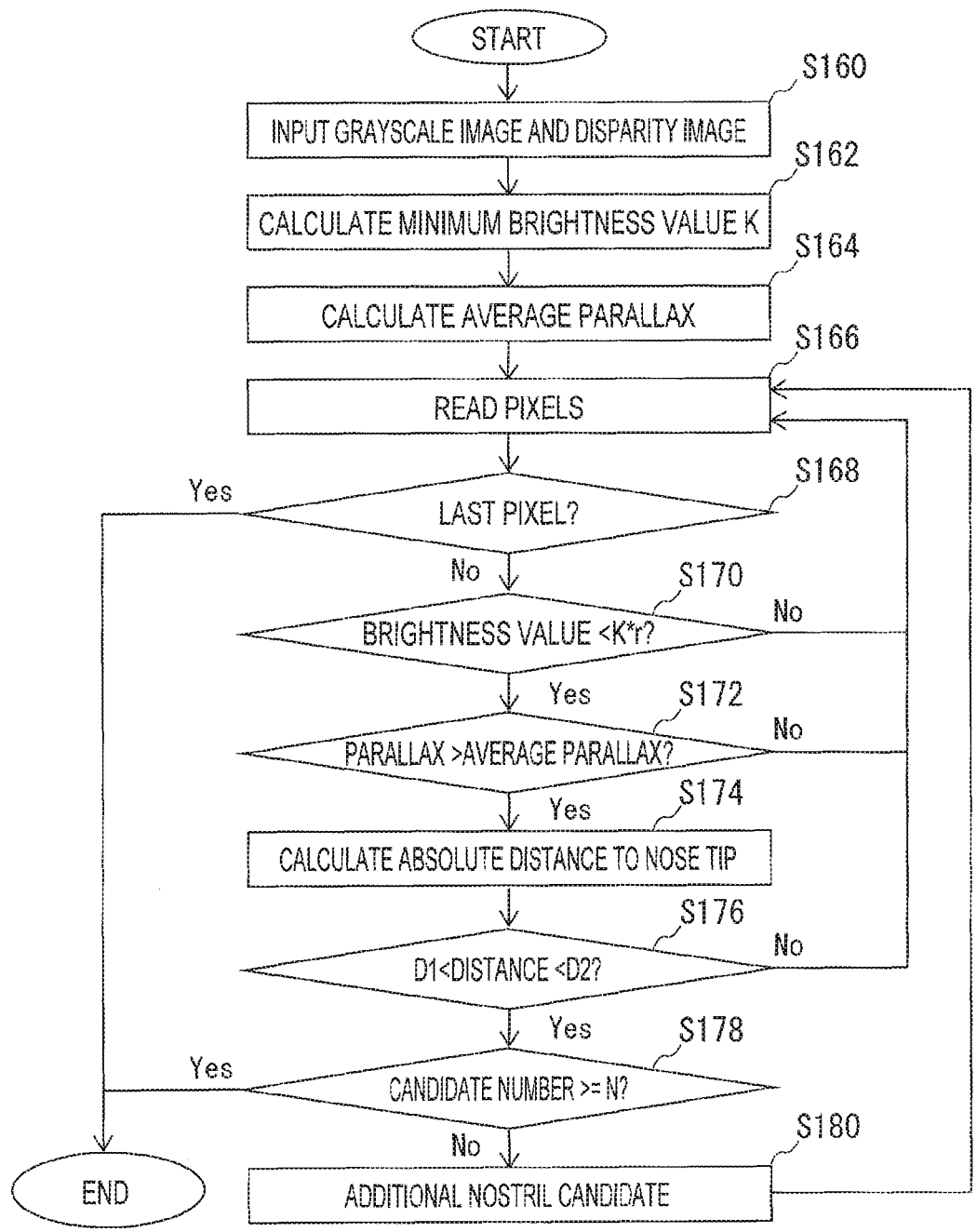
FIG. 10 is a flowchart describing processes by a second nostril candidate detecting unit according to the embodiment.

Next, operation of the second nostril candidate detecting unit 228 will be described. FIG. 10 is a flowchart describing processes by the second nostril candidate detecting unit 228. Here, extraction of non-circular nostril candidates will be described. When the face is oriented diagonally, nostril candidates having a shape different from a circle need to be detected.

A parallax image data is inputted to the second nostril candidate detecting unit 228 (S160). Next, the second nostril candidate detecting unit 228 calculates the minimum brightness value K in a brightness nose image data (S162), and then calculates an average parallax of the parallax image data (S164).

Next, the second nostril candidate detecting unit 228 reads pixels in the brightness image data as processing targets (S166). The second nostril candidate detecting unit 228 then determines whether or not processing on all pixels in the brightness image data has ended (S168). When the processing on all pixels in the brightness image data has ended (S166: Yes), the entire processing is ended.

On the other hand, when the processing on all pixels has not ended (S168: No), the second nostril candidate detecting unit 228 determines whether or not the brightness value of the pixel is less than r times the minimum brightness value K (S170). Since the brightness values of the nostrils exhibit values lower than pixels around the nostril, r can be set so as to correspond to the brightness values of the nostrils. The value of r here is set to a value between 1.0 to 1.5, for example.

When the brightness value of a pixel is not less than a brightness value K·r (S170: No), the process on the pixel is ended and the flow returns to the process in S166. On the other hand, when the brightness value of a pixel is less than a brightness value K·r (S170: Yes), it is determined whether or not the parallax value of the pixel is higher than an average parallax (S172). When the parallax value of the pixel is equal to or less than an average parallax (S172: No), the process on the pixel is ended and the flow returns to the process in S166. On the other hand, when the parallax value of the pixel is greater than the average parallax (S172: Yes), an absolute distance (distance in the three-dimensional space) between this pixel and the nose tip, that is, a distance from the center of the image data is calculated using equation (12) (S174).

"Lengh" in equation (12) is an absolute distance between the nose tip and the pixel, "d1" is a parallax of the nose tip, "d2" is a parallax of the pixel to be processed.

$$D=2\times B\times \text{Lengh}/(d1+d2) \quad (12)$$

Next, it is determined whether or not the absolute distance D is greater than threshold D1 and smaller than threshold D2 (S176). Here, the detection range of nostril candidates is restricted by the absolute distance to the nose tip. That is, D1 and D2 are set based on the distance between the actual human nostrils and nose tip, and for example, values of D1=0.6 cm, D2=2.0 cm can be used.

When the absolute distance D is equal to or less than D1 or equal to or greater than D2 (S176: No), the process on the pixel is ended and the flow returns to the process in S166. On the other hand, when the absolute distance D is greater than D1 and smaller than D2 (S176: Yes), it is determined whether or not the number of already selected candidates satisfies N (S178). When the number of already selected candidates does not satisfy N (S178: No), this pixel is added to the nose candidates (S180) and the flow returns to the process in S166.

On the other hand, when the number of already selected candidates satisfies N (S178: Yes), the candidates are not added as nose candidates and the entire processing is ended. When the amount of processing need not be considered important, the number of candidates N may be set to the maximum number of pixels so as to process all pixels.

Figure 11:
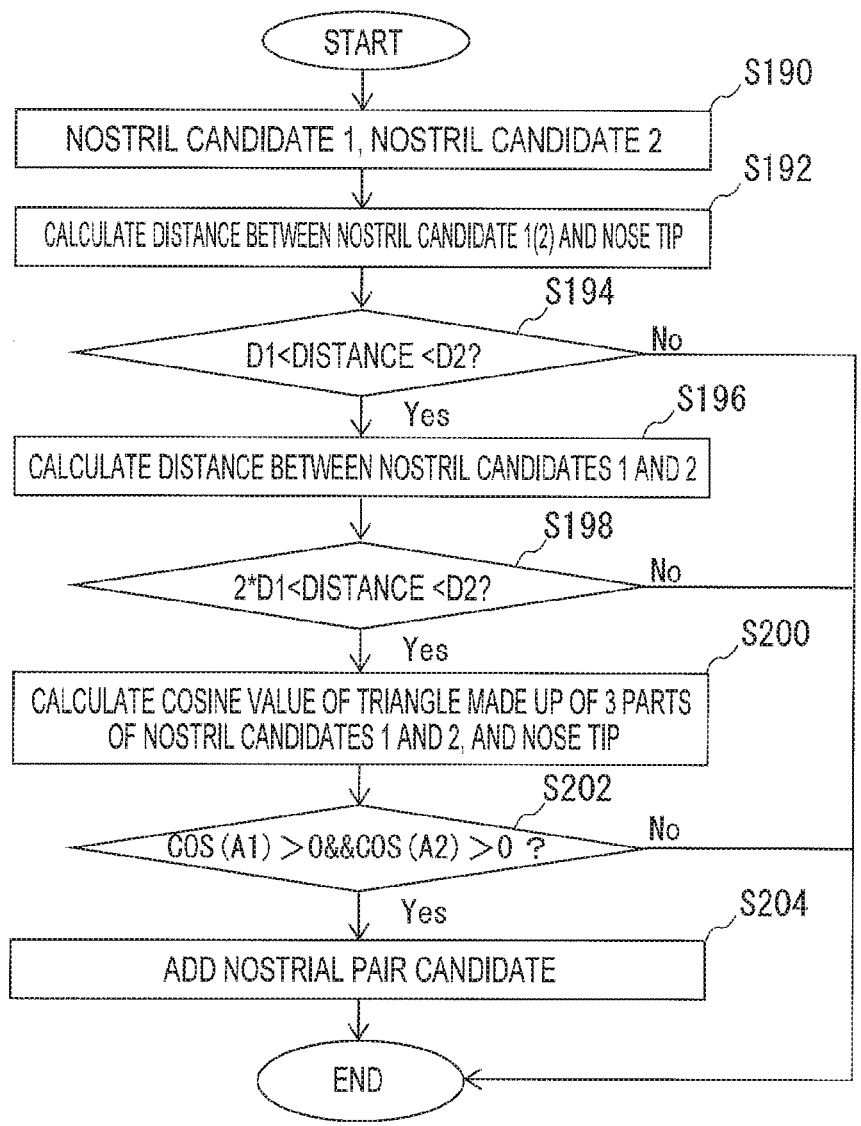
FIG. 11 is a flowchart describing processes by a nostril pair processing unit according to the embodiment.

Next, operation of the nostril pair detecting unit 204 will be described. FIG. 11 is a flowchart describing processes by the nostril pair processing unit 230. Here, a case will be described where it is determined whether or not a combination of two nostrils satisfies a nostril pair candidate condition. The number of combinations of nostrils at most is N×(N−1)/2 since the nostril candidate detecting unit 220 detects N nostril candidates. That is, a case will be described where these combinations of nostrils are sequentially inputted to and processed in the nostril pair processing unit 230.

The nostril pair processing unit 230 inputs a combination of a nostril candidate 1 and a nostril candidate 2 (S190). Next, the nostril pair processing unit 230 calculates an absolute distance between the nostril candidate 1 and the nose tip using equation (12). Similarly, the nostril pair processing unit 230 calculates an absolute distance between the nostril candidate 2 and the nose tip (S192).

Next, the nostril pair processing unit 230 determines whether or not the distance between the nostril candidate 1 and the nose tip, and the distance between the nostril candidate 2 and the nose tip are greater than D1 and less than D2 respectively (S194). When the respective distances are equal to or less than D1 or equal to or greater than D2 (S194: No), the combination determination process is ended. On the other hand, when the respective distances are greater than D1 and less than D2 (S194: Yes), the absolute distance between the nostril candidate 1 and the nostril candidate 2 is calculated using equation (12) (S196). In this case, d1 is assumed to be the parallax of the nostril candidate 1 and d2 is assumed to be the parallax of the nostril candidate 2.

Next, it is determined whether or not the distance between the nostril candidate 1 and the nostril candidate 2 is greater than 2*D1 and less than D2. (S198). When the distance between the nostril candidate 1 and the nostril candidate 2 is equal to or less than 2*D1 or greater than D2 (S198: No), this combination determination process is ended.

On the other hand, when the distance between the nostril candidate 1 and the nostril candidate 2 is greater than 2*D1 and less than D2 (S198: Yes), a cosine value of a triangle made up of the nostril candidate 1, the nostril candidate 2 and the nose tip is calculated (S200).

Figure 12A:
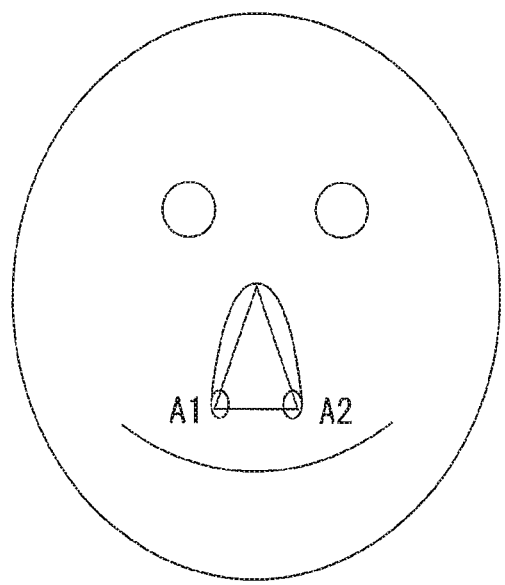
FIG. 12A is a diagram illustrating a triangle made up of two nostril candidates and an nose tip in a frontal face according to the embodiment.
Figure 12B:
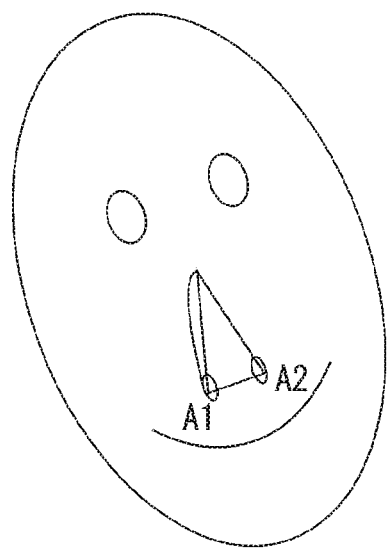
FIG. 12B is a diagram illustrating a triangle made up of two nostril candidates and an nose tip in a tilted face according to the embodiment.

Here, the triangle made up of two nostril candidates and the nose tip will be described. FIG. 12A is a diagram illustrating a triangle made up of two nostril candidates and the nose tip on a frontal face. FIG. 12B is a diagram illustrating a triangle made up of two nostril candidates and the nose tip on a tilted face. With the nose tip and the left and right nostrils of a human nose, angles A1 and A2 located at the positions of the nostril candidates range 0 to 90 degrees no matter what is the orientation of the face.

It is determined whether values of cos(A1) and cos(A2) are greater than 0 (S202). When the value of cos(A1) is equal to or less than 0 or the value of cos(A2) is equal to or less than 0 (S202: No), the process on this combination is ended. On the other hand, when the values of cos(A1) and cos(A2) are greater than 0 (S202: Yes), the nostril candidate 1 and the nostril candidate 2 are assumed to be nostril pair candidates (S204), and the process on this combination is ended. In this way, nostril pair candidates are selected from among N×(N−1)/2 combinations of nostrils.

Figure 13:
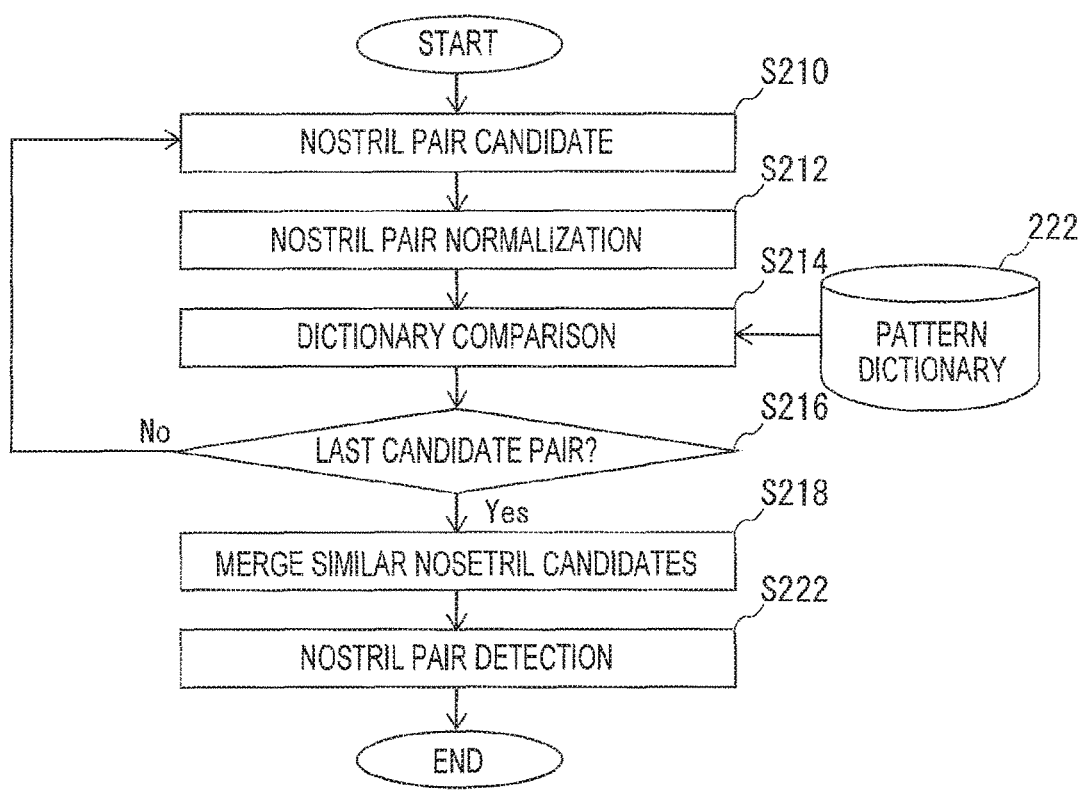
FIG. 13 is a flowchart describing identification processes by a nostril pair detecting unit according to the embodiment.

Next, operation of the nostril pair detecting unit 204 will be described. FIG. 13 is a flowchart describing identification processes by the nostril pair detecting unit 204. Here, a process will be described which identifies whether or not a nostril pair candidate selected by the nostril pair processing unit 230 is a nostril pair.

The nostril pair detecting unit 204 inputs a nostril pair candidate (S210). Next, the second extraction section 232 extracts a rectangle region surrounding the nostril pair candidate as a candidate region and normalizes the image data in the candidate region (S212).

Figure 14:
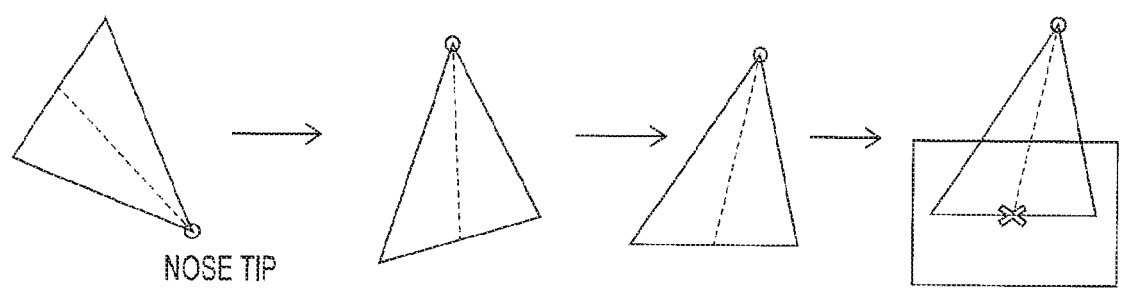
FIG. 14 is a diagram describing normalization of a candidate region according to the embodiment.

Here, this normalization will be described. FIG. 14 is a diagram describing normalization of a candidate region. First, a nose image data is rotated and a straight line connecting the nose tip and the center point of the nostril pair candidate is placed in a vertical position. In this case, the nose image data is rotated so that the nose tip is located above and the nostril pair candidate is located below the nose tip. Next, the image data is rotated again and the nostril pair candidate is put in a horizontal position. Assuming a midpoint of the nostril pair candidate arranged horizontally as the center, a rectangle region surrounding the nostril pair candidate is assumed to be a candidate region. Next, the second acquisition unit 234 resizes the image data within the candidate region to a fixed size and calculates a normalized image data as a template.

The second identification unit 236 calculates a comparison score showing similarity between the template and the reference image data registered with the pattern dictionary 222 (S214). Here, for example, a normalization correlation value between the template and the reference image data is calculated as a comparison score.

Next, the nostril pair detecting unit 204 determines whether or not processing on all nostril pair candidates is completed (S216). When processing on all nostril pair candidates is not completed (S216: No), the nostril pair detecting unit 204 returns to S210.

On the other hand, when processing on all nostril pair candidates is completed (S216: Yes), the second identification unit 236 merges, based on the X and Y coordinates of the nostril pair, the nostril pair candidates whose X and Y coordinates are to close to each other into one nostril candidate (S218). This makes it possible to reduce the number of nostril pair candidates.

Next, the second identification unit 236 detects nostril pair candidate having the highest comparison score among the nostril pair candidates as a nostril pair (S222) and ends the processing. The pattern dictionary 222 registers an image data obtained by averaging a plurality of training normalization image data as a reference image. That is, an average value of a plurality of nostril pair image data whose sizes are normalized as a reference image data.

Next, operation of the authentication apparatus 100 will be described. The face authenticating unit 106 extracts a face region based on the nose tip and nostril information obtained in the identification apparatus 200. In this case, since the inclination of the face and orientation thereof can be inferred from analogy using the nose tip and nostril information, the face region can be extracted more accurately.

Next, the face authenticating unit 106 calculates feature values to be used for authentication from the face region and compares the feature values with feature values registered with the dictionary. When a comparison score exceeds a predetermined value, the face authenticating unit 106 determines that the face to be authenticated is a human face registered beforehand. On the other hand, when the comparison score is less than a predetermined value, the face authenticating unit 106 determines that the face to be authenticated is not registered.

Thus, according to the embodiment, the size of a candidate region is determined using parallax information, and it is thereby possible to identify the candidate region more accurately by reducing influences of a variation in the position of an object. Moreover, candidate points of the nose tip is detected according to the value of curvature of the three-dimensional curved surface generated based on three-dimensional coordinates and a candidate region is extracted according to the candidate points, and it is thereby possible to more stably extract a candidate region and increase the detection accuracy of the nose tip still more.

Furthermore, nostril candidates are detected based on shape information and further nostril candidates are detected based on brightness information and parallax information, and it is thereby possible to detect a nostril candidate from a tilted face, too. For this reason, it is possible to extract more stably a candidate region including a nostril pair and further increase the detection accuracy of the nostril pair. According to the embodiment, the face has been described as an example of the object, but the face is presented only as an example, and this is not intended to limit the object to the face.

As described above, according to the identification apparatus 200 according to the embodiment, the first extraction section 214 determines the size of a candidate region corresponding to candidate points of the nose tip using parallax information in the face region. For this reason, the first acquisition unit 216 can acquire feature values from the candidate region while reducing influences of a positional variation in the face region and the first identification unit 218 can prevent deterioration of the identification accuracy of the candidate region due to a positional variation in the face.

Furthermore, the second extraction section 232 determines the size of the candidate region corresponding to nostril pair candidates using the parallax information in the face region. For this reason, the second acquisition unit 234 can acquire a template from the candidate region with influences of a positional variation of the face region reduced, and the second identification unit 236 can prevent deterioration of the identification accuracy of the candidate region due to a positional variation of the face.

At least a part of the identification apparatus and authentication system in the above embodiments may be formed of hardware or software. In the case of software, a program realizing at least a partial function of the identification apparatus and authentication system may be stored in a recording medium such as a flexible disc, CD-ROM, etc. to be read and executed by a computer. The recording medium is not limited to a removable medium such as a magnetic disk, optical disk, etc., and may be a fixed-type recording medium such as a hard disk device, memory, etc.

Further, a program realizing at least a partial function of the image processor 1 can be distributed through a communication line (including radio communication) such as the Internet. Furthermore, this program may be encrypted, modulated, and compressed to be distributed through a wired line or a radio link such as the Internet or through a recording medium storing it therein.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An identification apparatus comprising:
a first nostril candidate detecting unit configured to detect circular nostril candidates from an image region determined based on a position of a nose tip;
a second nostril candidate detecting unit configured to detect a region in which a brightness value in the image region is equal to or less than a predetermined value and a parallax is equal to or greater than a predetermined value as a nostril candidate;
a nostril pair processing unit configured to designate the nostril candidate as a nostril pair candidate;
a nostril pair extraction unit configured to extract, from an image data, a candidate region including the nostril pair candidate using parallax information;
a nostril pair acquisition unit configured to acquire a characteristic value based on image information in the candidate region; and
a nostril pair identification unit configured to identify whether the candidate region corresponds to the nostril pair based on similarity between the characteristic value and a reference characteristic value.

2. The identification apparatus according to claim 1, further comprising:
a nose tip detection unit configured to transform two-dimensional coordinates corresponding to pixels in the face region into three-dimensional coordinates using the parallax information and to detect the candidate points of the nose tip according to a curvature value of a three-dimensional curved surface generated based on the three-dimensional coordinates, wherein the candidate points are three-dimensional coordinates indicating nose tip candidates; and
a nose tip extraction unit configured to extract the candidate region based on the candidate points of the nose tip.

3. The identification apparatus according to claim 2, further comprising:
a nose tip acquisition unit configured to acquire feature values based on a gradient value in the candidate region as the characteristic values; and
a nose tip identification unit configured to identifie whether the candidate region corresponds to the nose tip.

4. The identification apparatus according to claim 2, wherein the nose tip extraction unit extracts a plurality of candidate regions corresponding to a plurality of candidate points respectively, and
the nose tip identification unit identifies a candidate region having a feature value exhibiting highest similarity with the reference feature value and designates a candidate point corresponding to the candidate region as the predetermined nose tip.

5. The identification apparatus according to claim 2, wherein the nose tip detection unit transforms a range predetermined based on the predetermined object into a three-dimensional curved surface.

6. The identification apparatus according to claim 5, wherein the nose tip detection unit transforms the predetermined range into a three-dimensional curved surface based on an average value of a parallax corresponding to the object region.

7. The identification apparatus according to claim 6, wherein the nose tip detection unit generates a three-dimensional curved surface using three-dimensional coordinates arranged at predetermined intervals among the three-dimensional coordinates.

8. The identification apparatus according to claim 1, wherein the nostril pair processing unit designates the nostril candidates as the nostril pair candidates based on an absolute distance between nostril candidates and a positional relationship between the nose tip and the nose candidates.

9. The identification apparatus according to claim 1, wherein the nostril pair extraction unit extracts a rectangle region surrounding the nostril pair candidate based on a center point of the nostril pair candidate, and normalizes the rectangle region as the candidate region.

10. An authentication system comprising:
a first nostril candidate detecting unit configured to detect circular nostril candidates from an image region determined based on a position of a nose tip;
a second nostril candidate detecting unit configured to detect a region in which a brightness value in the image region is equal to or less than a predetermined value and a parallax is equal to or greater than a predetermined value as a nostril candidate;
a nostril pair processing unit configured to designate the nostril candidate as a nostril pair candidate;
a nostril pair extraction unit configured to extract, from an image data, a candidate region including the nostril pair candidate using parallax information;
a nostril pair acquisition unit configured to acquire a characteristic value based on image information in the candidate region;
a nostril pair identification unit configured to identify whether or not the candidate region corresponds to the nostril pair based on similarity between the characteristic value and a reference characteristic value; and
an authentication unit configured to acquire information used for authentication from the image based on position information of the nostril pair candidate included in the candidate region which is identified as the region corresponding to the nostril pair and authenticates whether the object is a preregistered object.

11. The authentication system according to claim 10, wherein the image is a brightness image captured by two cameras having predetermined base lengths, and the parallax information is information based on the parallax image obtained using the brightness image captured by the two cameras.

12. The authentication system according to claim 10, further comprising:
   a nose tip detection unit configured to transform two-dimensional coordinates corresponding to pixels in the face region into three-dimensional coordinates using the parallax information and to detect the candidate points of the nose tip according to a curvature value of a three-dimensional curved surface generated based on the three-dimensional coordinates, wherein the candidate points are three-dimensional coordinates indicating nose tip candidates; and
   a nose tip extraction unit extracts the candidate region based on the candidate points.

13. The authentication system according to claim 12, wherein the nose tip detection unit transforms a predetermined range based on the predetermined object into the three-dimensional curved surface.

14. The authentication system according to claim 10, further comprising:
   a nose tip acquisition unit acquires feature values based on a gradient value in the candidate region as the characteristic values; and
   a nose tip identification unit identifies whether the candidate region corresponds to the nose tip.

15. The authentication system according to claim 14, wherein the nose tip extraction unit extracts a plurality of candidate regions corresponding to a plurality of candidate points respectively, and
   the nose tip identification unit identifies a candidate region having a feature value exhibiting highest similarity with the reference feature value and designates a candidate point corresponding to the candidate region as the predetermined object.

16. An identification method comprising:
   detecting circular nostril candidates from an image region determined based on a position of a nose tip;
   detecting a region, in which a brightness value in the image region is equal to or less than a predetermined value and a parallax is equal to or greater than a predetermined value, as a nostril candidate;
   designating the nostril candidate as a nostril pair candidate;
   extracting, from a given object region in an image, a candidate region including the nostril pair candidate, using parallax information;
   acquiring a characteristic value based on image information in the candidate region; and
   identifying whether the candidate region corresponds to the nostril pair based on similarity between the characteristic value and a reference characteristic value.

* * * * *